United States Patent
Biswas et al.

(10) Patent No.: US 9,842,308 B1
(45) Date of Patent: Dec. 12, 2017

(54) SYSTEMS AND METHODS FOR RULES BASED SHIPPING

(75) Inventors: Michael John Biswas, Los Angeles, CA (US); Geoffrey C. Begen, Lake Forest, CA (US)

(73) Assignee: Stamps.com Inc., El Segundo, CA (US)

( * ) Notice: Subject to any disclaimer, the term of this patent is extended or adjusted under 35 U.S.C. 154(b) by 560 days.

(21) Appl. No.: 12/713,052

(22) Filed: Feb. 25, 2010

(51) Int. Cl.
*G06Q 30/00* (2012.01)
*G06Q 10/08* (2012.01)

(52) U.S. Cl.
CPC ................. *G06Q 10/083* (2013.01)

(58) Field of Classification Search
CPC .. G06Q 10/08; G06Q 10/083; G06Q 10/0832; G06Q 10/0834; G06Q 10/0838; G06Q 10/0835; G06Q 10/08355; G06Q 10/047
USPC .... 705/401–411, 300, 60–62, 26.1–27.2, 30, 705/34, 35, 39, 44, 330–341; 235/375, 235/380, 381; 380/51; 700/28–36, 95, 700/115, 213–227
See application file for complete search history.

(56) References Cited

U.S. PATENT DOCUMENTS

| | | | |
|---|---|---|---|
| 1,684,756 A | 9/1928 | Close | |
| 1,988,908 A | 1/1935 | MacKinnon | |
| 2,825,498 A | 3/1958 | Alves | |
| 2,887,326 A | 5/1959 | Kramer | |
| 3,221,980 A | 12/1965 | Mecur | |
| 3,380,648 A | 4/1968 | De Lyra | |
| 3,658,239 A | 4/1972 | Foutz | |
| 3,747,837 A | 7/1973 | Wilson | |
| 3,978,457 A | 8/1976 | Check, Jr. et al. | |
| 4,024,380 A | 5/1977 | Gunn | |
| 4,245,775 A | 1/1981 | Conn | |
| 4,253,158 A | 2/1981 | McFiggans | |
| 4,271,481 A | 6/1981 | Check, Jr. et al. | |

(Continued)

FOREIGN PATENT DOCUMENTS

| | | |
|---|---|---|
| EP | 0137737 | 5/1991 |
| EP | 0 927 963 | 12/1997 |

(Continued)

OTHER PUBLICATIONS

U.S. Appl. No. 12/354,466, Salim G. Kara.

(Continued)

*Primary Examiner* — Igor Borissov
(74) *Attorney, Agent, or Firm* — Norton Rose Fulbright US LLP (57) ABSTRACT

Systems and methods which implement a rules based engine for processing items for shipping are shown. Embodiments implement a series of rules that are executed in a particular order to address decision points in processing individual items of a plurality of items for shipping. A user interface adapted to allow a user to create rules, weigh or order the rules, revise rules, enable/disable rules, etc. is provided according to embodiments. By selecting and associating various rule parameters, such as conditions, operators, and/or outcomes, through the rules interface a user may create and revise rules as desired. The rules interface of embodiments provides a hierarchical rules environment in which the resulting rules are weighted or ordered for hierarchical implementation.

35 Claims, 2 Drawing Sheets

(56) References Cited

U.S. PATENT DOCUMENTS

| | | |
|---|---|---|
| 4,306,299 A | 12/1981 | Check, Jr. et al. |
| 4,376,299 A | 3/1983 | Rivest |
| 4,511,793 A | 4/1985 | Racanelli |
| 4,565,317 A | 1/1986 | Kranz |
| 4,629,871 A | 12/1986 | Scribner et al. |
| 4,641,347 A | 2/1987 | Clark et al. |
| 4,649,266 A | 3/1987 | Eckert |
| 4,661,001 A | 4/1987 | Takai et al. |
| 4,709,850 A | 12/1987 | Wagner |
| 4,725,718 A | 2/1988 | Sansone et al. |
| 4,743,747 A | 5/1988 | Fougere et al. |
| 4,757,537 A | 7/1988 | Edelmann et al. |
| 4,760,532 A | 7/1988 | Sansone et al. |
| 4,763,271 A | 8/1988 | Field |
| 4,775,246 A | 10/1988 | Edelmann et al. |
| 4,784,317 A | 11/1988 | Chen et al. |
| 4,800,506 A | 1/1989 | Axelrod et al. |
| 4,802,218 A | 1/1989 | Wright et al. |
| 4,812,994 A | 3/1989 | Taylor et al. |
| 4,821,195 A | 4/1989 | Baer et al. |
| 4,831,554 A | 5/1989 | Storace et al. |
| 4,831,555 A | 5/1989 | Sansone et al. |
| 4,837,701 A | 6/1989 | Sansone et al. |
| 4,853,865 A | 8/1989 | Sansone et al. |
| 4,858,138 A | 8/1989 | Talmadge |
| 4,862,386 A | 8/1989 | Axelrod et al. |
| 4,864,618 A | 9/1989 | Wright et al. |
| 4,868,757 A | 9/1989 | Gil |
| 4,873,645 A | 10/1989 | Hunter et al. |
| 4,900,903 A | 2/1990 | Wright et al. |
| 4,900,904 A | 2/1990 | Wright et al. |
| 4,900,941 A | 2/1990 | Barton et al. |
| 4,901,241 A | 2/1990 | Schneck |
| 4,908,770 A | 3/1990 | Breault et al. |
| 4,910,686 A | 3/1990 | Chang et al. |
| 4,919,325 A | 4/1990 | Culver |
| 4,933,849 A | 6/1990 | Connell et al. |
| 4,934,846 A | 6/1990 | Gilham |
| 4,941,091 A | 7/1990 | Breault et al. |
| 4,947,333 A | 8/1990 | Sansone et al. |
| 4,993,752 A | 2/1991 | Juszak |
| 4,998,204 A | 3/1991 | Sansone et al. |
| 5,025,141 A | 6/1991 | Bolan |
| 5,058,008 A | 10/1991 | Schumacher |
| 5,065,000 A | 11/1991 | Pusic |
| 5,079,714 A | 1/1992 | Manduley et al. |
| 5,085,470 A | 2/1992 | Peach et al. |
| 5,091,771 A | 2/1992 | Bolan et al. |
| 5,111,030 A | 5/1992 | Brasington et al. |
| 5,119,306 A | 6/1992 | Metelits et al. |
| 5,136,647 A | 8/1992 | Haber et al. |
| 5,150,407 A | 9/1992 | Chan |
| 5,200,903 A | 4/1993 | Gilham et al. |
| 5,202,834 A | 4/1993 | Gilham et al. |
| 5,233,657 A | 8/1993 | Gunther et al. |
| 5,237,506 A | 8/1993 | Horbal et al. |
| 5,239,168 A | 8/1993 | Dursty, Jr. et al. |
| 5,280,531 A | 1/1994 | Hunter |
| 5,289,540 A | 2/1994 | Jones |
| 5,316,208 A | 5/1994 | Petkovsek |
| 5,319,562 A | 6/1994 | Whitehouse |
| 5,323,323 A | 6/1994 | Gilham et al. |
| 5,323,465 A | 6/1994 | Avarne |
| 5,341,505 A | 8/1994 | Whitehouse |
| 5,375,172 A | 12/1994 | Chrosny |
| 5,388,049 A | 2/1995 | Sansone et al. |
| 5,423,573 A | 6/1995 | de Passille |
| 5,437,441 A | 8/1995 | Tuhro et al. |
| 5,439,721 A | 8/1995 | Pedroli et al. |
| 5,454,038 A | 9/1995 | Cordery et al. |
| 5,468,945 A | 11/1995 | Huggett et al. |
| 5,471,925 A | 12/1995 | Heinrich et al. |
| 5,476,420 A | 12/1995 | Manning |
| 5,490,077 A | 2/1996 | Freytag |
| 5,501,393 A | 3/1996 | Walz |
| 5,510,992 A | 4/1996 | Kara |
| 5,573,277 A | 11/1996 | Petkovsek |
| 5,583,779 A | 12/1996 | Naclerio et al. |
| 5,598,970 A | 2/1997 | Mudry et al. |
| 5,600,562 A | 2/1997 | Guenther |
| 5,602,743 A | 2/1997 | Freytag |
| 5,606,507 A | 2/1997 | Kara |
| 5,606,508 A | 2/1997 | Thiel |
| 5,606,613 A | 2/1997 | Lee et al. |
| 5,615,123 A | 3/1997 | Davidson et al. |
| 5,615,312 A | 3/1997 | Kohler |
| 5,617,519 A | 4/1997 | Herbert |
| 5,619,571 A | 4/1997 | Sandstrom et al. |
| 5,623,546 A | 4/1997 | Hardy et al. |
| 5,649,118 A | 7/1997 | Carlisle et al. |
| 5,650,934 A | 7/1997 | Manduley |
| 5,655,023 A | 8/1997 | Cordery et al. |
| 5,666,284 A | 9/1997 | Kara |
| 5,675,650 A | 10/1997 | Cordery et al. |
| 5,696,829 A | 12/1997 | Cordery et al. |
| 5,706,502 A | 1/1998 | Foley et al. |
| 5,715,314 A | 2/1998 | Payne et al. |
| 5,717,596 A | 2/1998 | Bernard et al. |
| 5,717,597 A | 2/1998 | Kara |
| 5,742,683 A | 4/1998 | Lee et al. |
| 5,745,887 A | 4/1998 | Gargiulo et al. |
| 5,774,554 A | 6/1998 | Gilham |
| 5,774,886 A | 6/1998 | Kara |
| 5,778,076 A | 7/1998 | Kara et al. |
| 5,791,553 A | 8/1998 | Fabel |
| 5,796,834 A | 8/1998 | Whitney et al. |
| 5,799,290 A | 8/1998 | Dolan et al. |
| 5,801,364 A | 9/1998 | Kara et al. |
| 5,801,944 A | 9/1998 | Kara |
| 5,805,810 A | 9/1998 | Maxwell |
| 5,812,991 A | 9/1998 | Kara |
| 5,819,240 A | 10/1998 | Kara |
| 5,822,739 A | 10/1998 | Kara |
| 5,825,893 A | 10/1998 | Kara |
| 5,860,068 A | 1/1999 | Cook |
| 5,884,277 A | 3/1999 | Khosla |
| 5,902,439 A | 5/1999 | Pike et al. |
| 5,923,406 A | 7/1999 | Brasington et al. |
| 5,923,885 A | 7/1999 | Johnson et al. |
| 5,929,415 A | 7/1999 | Berson |
| 5,946,671 A | 8/1999 | Herring et al. |
| 5,983,209 A | 11/1999 | Kara |
| 6,005,945 A | 12/1999 | Whitehouse |
| 6,010,156 A | 1/2000 | Block |
| 6,026,385 A | 2/2000 | Harvey et al. |
| 6,061,670 A | 5/2000 | Brand |
| 6,098,057 A | 8/2000 | Dlugos |
| D434,438 S | 11/2000 | Kara |
| 6,155,476 A | 12/2000 | Fabel |
| 6,173,888 B1 | 1/2001 | Fabel |
| 6,202,057 B1 | 3/2001 | Pierce |
| 6,208,980 B1 | 3/2001 | Kara |
| 6,209,779 B1 | 4/2001 | Fabel |
| 6,233,565 B1 | 5/2001 | Lewis et al. |
| 6,442,525 B1 | 8/2002 | Silverbrook et al. |
| 6,470,327 B1 | 10/2002 | Carroll et al. |
| 6,721,717 B2 | 4/2004 | Kramer |
| 6,820,065 B1 | 11/2004 | Naclerio |
| 6,865,561 B1 | 3/2005 | Allport et al. |
| 7,359,887 B1* | 4/2008 | Hu et al. ............ 705/407 |
| 7,433,849 B2 | 10/2008 | Cordery et al. |
| 8,000,988 B1* | 8/2011 | Bezanson ........... G06Q 10/063 705/7.11 |
| 8,078,293 B2* | 12/2011 | Campagna ........... G06Q 10/08 700/32 |
| 8,150,781 B2* | 4/2012 | McCall et al. ............ 705/334 |
| 8,412,641 B2* | 4/2013 | Zeisset et al. ............ 705/330 |
| 8,630,912 B2 | 1/2014 | Seki et al. |
| 2001/0007086 A1 | 7/2001 | Rogers et al. |
| 2001/0032278 A1 | 10/2001 | Brown et al. |
| 2001/0037320 A1 | 11/2001 | Allport et al. |
| 2002/0032668 A1 | 3/2002 | Kohler et al. |
| 2002/0152127 A1 | 10/2002 | Hamilton et al. |
| 2003/0004824 A1 | 1/2003 | Joshi et al. |

(56) References Cited

U.S. PATENT DOCUMENTS

| | | | |
|---|---|---|---|
| 2003/0144972 A1 | 7/2003 | Cordery et al. | |
| 2004/0083189 A1 | 4/2004 | Leon | |
| 2004/0089711 A1* | 5/2004 | Sandru | G06Q 20/042 235/379 |
| 2004/0122779 A1 | 6/2004 | Stickler et al. | |
| 2004/0133438 A1* | 7/2004 | Zeisset et al. | 705/1 |
| 2004/0243523 A1 | 12/2004 | Herbert | |
| 2004/0258089 A1 | 12/2004 | Derechin et al. | |
| 2006/0195798 A1* | 8/2006 | Chan et al. | 715/853 |
| 2006/0224398 A1* | 10/2006 | Lakshman | G06Q 10/08 705/333 |
| 2007/0011023 A1 | 1/2007 | Silverbrook | |
| 2007/0174213 A1 | 7/2007 | Whitehouse et al. | |
| 2007/0233754 A1* | 10/2007 | Baeuerle et al. | 707/203 |
| 2008/0027737 A1* | 1/2008 | Watkins | 705/1 |
| 2008/0127139 A1 | 5/2008 | Skaistis | |
| 2008/0178162 A1 | 7/2008 | Sanford et al. | |
| 2008/0228669 A1 | 9/2008 | Harris et al. | |
| 2008/0298568 A1* | 12/2008 | Karandikar | G06Q 30/04 379/114.03 |
| 2009/0144230 A1 | 6/2009 | Fant | |
| 2009/0241030 A1 | 9/2009 | von Eicken et al. | |
| 2009/0319395 A1* | 12/2009 | Chandaria | 705/26 |
| 2011/0071954 A1* | 3/2011 | McCall et al. | 705/337 |

FOREIGN PATENT DOCUMENTS

| | | |
|---|---|---|
| EP | 926632 A2 | 6/1999 |
| EP | 0 927 958 | 7/1999 |
| FR | 2580844 | 10/1986 |
| GB | 2251210 | 7/1992 |
| JP | 05-132049 | 5/1993 |
| JP | 09-508220 | 8/1997 |
| JP | 02000105845 | 4/2000 |
| JP | 04284558 B2 | 6/2009 |
| WO | WO-88/01818 A1 | 3/1988 |
| WO | WO-95/19016 | 7/1995 |
| WO | WO-98/14909 | 4/1998 |
| WO | WO-9814907 | 4/1998 |
| WO | WO-98/57302 | 12/1998 |
| WO | WO-98/57480 | 12/1998 |

OTHER PUBLICATIONS

U.S. Appl. No. 10/862,058, Pagel et al.

U.S. Appl. No. 09/820,377, filed Mar. 27, 2001, Williams et al.

Davis Brad L.; "Printing System for Preventing Injustice by Delivering Print Data from Postal Charge Meter to Printer," Jan. 2001, 1 page.

Office Action dated Mar. 13, 2007 for JP 515,253/97; with English language translation (4 pages).

Minnick, Robert, "Postage Imprinting Apparatus and Methods for Use With a Computer Printer", Apr. 27, 1995, 71 pgs.

Office Action issued for Japanese Patent Application No. 515,253/1997, dated Apr. 21, 2009; 5 pages (with English language translation).

"Information-Based Indicia Program (IBIP): Performance Criteria for Information-Based Indicia and Security Architecture for Open IBI Postage Evidencing Systems," Feb. 23, 2000, The United States Postal Service (USPS), 79 pages.

Unpublished U.S. Appl. No. 10/606,579 to Ogg, filed Jun. 26, 2003 and entitled "System and Method for Automatically Processing Mail."

\* cited by examiner

SYSTEMS AND METHODS FOR RULES BASED SHIPPING

CROSS-REFERENCE TO RELATED APPLICATIONS

The present application is related to commonly assigned U.S. patent application Ser. No. 12/713,033 entitled "Systems and Methods for Providing Localized Functionality in Browser Based Postage Transactions," filed Feb. 25, 2010; Ser. No. 12/354,466 entitled "System and Method for Printing Postage Indicia with Post-By Date," filed Jan. 15, 2009 and issued Jun. 5, 2012 as U.S. Pat. No. 8,195,579; Ser. No. 10/862,058 entitled "Virtual Security Device," filed Jun. 4, 2004; and Ser. No. 12/273,384 entitled "System and Method for Dynamically Partitioning a Postage Evidencing System," filed Nov. 18, 2008, the disclosures of which are hereby incorporated herein by reference in their entirety.

TECHNICAL FIELD

The present invention relates to processing items for shipping and, more particularly, to providing rules based shipping processing.

BACKGROUND OF THE INVENTION

Computer based systems for generating and printing postage indicia have been available for a number of years, see for example U.S. Pat. No. 5,510,992 entitled "System and Method for Automatically Printing Postage on Mail" and U.S. Pat. No. 5,822,739 entitled "System and Method for Remote Postage Metering," assigned to Stamps.com Inc. the assignee of the present application. Such computer based systems have largely replaced more traditional postage meters in many market segments because of the widespread availability of appropriate host systems, ease of use, etc. However, there remains room for advancement with respect to the operation and use of such computer based systems in performing postage transactions.

Many computer based postage indicia generation and printing systems, although providing a viable solution for home and small office use, are not well suited for use by high volume shippers. For example, some such systems implement a client server computer based architecture which typically invokes a series of server calls from the client in order to generate and print postage indicia. Such a series of server calls can require appreciable time to complete an individual shipping transaction (e.g., process a single item). Although this latency may be acceptable in many situations, it can result in unacceptable delays when a high volume of items are to be processed for shipping.

Moreover, where a variety of different items are being processed for shipping (as opposed to a mass mailing of a same mail piece, for example), a plurality of different decision points for each item are typically implemented to appropriately process each individual item for shipping. For example, item information such as the weight and size of the item, class of service information such as first class, express, etc., and special delivery and handling information such as shipment tracking, return receipt requested, registered delivery, etc. may be solicited for each item in order to appropriately process the item for shipping. Although computer based systems may provide processing in accordance with a simple preference setting (e.g., a preference setting to default to a least expensive shipping option), such systems heretofore have not addressed the various decision points in a manner to adequately facilitate high volume shipping of a variety of different items. That is, such a preference is merely a simple on/off or yes/no selection without providing any rules based operation for addressing various decision points.

BRIEF SUMMARY OF THE INVENTION

The present invention is directed to systems and methods which implement a rules based engine for processing items for shipping. Embodiments of the invention implement a series of rules that are executed in a particular order to address decision points in processing individual items of a plurality of items for shipping. Accordingly, operation of a rules based engine of embodiments of the invention facilitates processing of a variety of different items for shipping by a high volume shipper.

Embodiments of the invention provide a user interface adapted to allow a user to create rules, weigh or order the rules, revise rules, enable/disable rules, etc. In operation of a rules interface according to embodiments, a user is presented with a plurality of conditions (e.g., as may be determined from or associated with raw shipping data, user defined data, derived data, etc.) from which various rules may be constructed, revised, etc. The user of embodiments is additionally provided with a plurality of operators (e.g., logical operators, mathematical operators, etc.) by a rules interface for use in constructing, revising, etc. rules herein. A rules interface of embodiments further presents a user with a plurality of outcomes (e.g., shipping processing decisions, determinations, etc.) for use in constructing, revising, etc. rules. By selecting and associating various of the foregoing rule parameters (i.e., conditions, operators, and/or outcomes) through a rules interface a user may create and revise rules as desired. For example, a rules interface may present the user with a graphical user interface from which various rule parameters may be selected and linked to provide desired rules.

Operation of a rules engine of embodiments of the invention thus allows the user to create one or more conditions from parameters (e.g., conditions and operators) whereby, once all conditions are met, one or more actions (e.g., user customizable actions) are enacted. The ability to arrange the created rules in a specific order of execution, such as through operation of the aforementioned rules interface, facilitates establishing relationships among the rules to provide functionality far beyond simple on/off or yes/no selection of an action.

Accordingly, a rules interface of embodiments provides a hierarchical rules environment in which a plurality of rules are weighted or ordered for hierarchical implementation. For example, a rules interface of embodiments provides a graphical user interface in which a user is enabled to order a plurality of different rules in a graphical hierarchy consistent with a desired hierarchical implementation.

Information used for determining various conditions may be provided by a number of sources according to embodiments of the invention. For example, raw shipping data, such as item weight, address information, item size, shipping container type, item type, and the like, may be utilized by rules engines of embodiments. Additionally or alternatively, user defined data, such as customer category, quality of service, pricing category, delivery time category, and the like, may be utilized by rules engines of embodiments. Moreover, derived data, such as calculated rates, calculated delivery date/time, and the like, may be utilized by rules engines of embodiments of the invention.

Embodiments of the invention operate to provide automated rule creation, revision, recommendation, etc. For example, a rules based engine of embodiments operates to analyze past shipping behavior of a user to create and recommend one or more rules, such as to provide processing of items for shipping in accordance with the user's historical shipping decisions. Additionally or alternatively, rules based engines of embodiments operate to compare item shipping processing performed by a user, including shipping processing performed using the rules based engine, with available options in order to recommend one or more rules or rule revisions, such as to provide the same or substantially the same shipping results at less cost. A rules based engine may operate to analyze various available information (e.g., item shipment tracking information, shipment volume information, customer order information, etc.) for providing automated rule creation, revision, recommendation, etc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
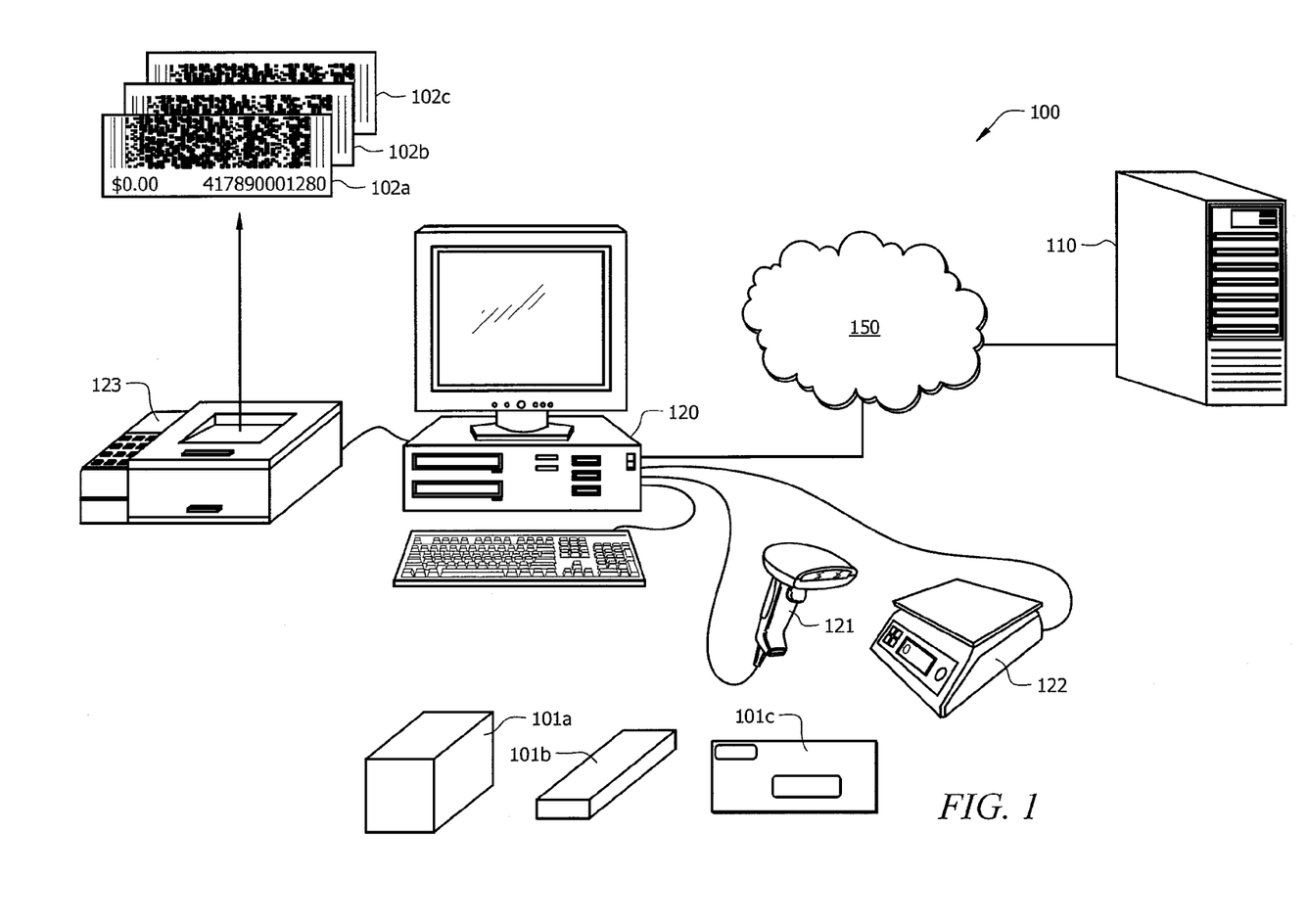
FIG. 1 shows a system adapted according to embodiments of the invention to implement shipping processing using a rules based engine.

FIG. 1 shows system 100 adapted according to embodiments of the invention to implement shipping processing using a rules based engine as described herein. In order to aid in understanding the concepts of the present invention, exemplary embodiments herein will be discussed with reference to operation of system 100 as a postage indicia generation and printing system. However, it should be appreciated that the concepts of the present invention are applicable to systems operable to provide additional or alternative functionality.

The illustrated embodiment of system 100 comprises user system 120 operable to provide shipment processing with respect to items to be shipped, such as items 101*a*-101*c*. User system 120 may comprise a system capable of independent operation and/or may comprise a client/server configuration. For example, user system 120 may provide operation independent of other systems of system 100, such as by operating under control of a locally executed instruction set for providing shipping processing. Additionally or alternatively, user system 120 may communicate with other systems of system 100, such as server system 110 via network 150, to provide desired operation or some portion thereof. For example, although providing some independent shipping processing, user system 120 of embodiments is operable as a postage client and correspondingly server system 120 of embodiments is operable as a postage server for generation of postage indicia in accordance with shipping processing by user system 120. It should be appreciated that various operations provided by user system 120 as described herein may be browser based, wherein functions are provided by a web server, downloadable applets, etc. Examples of browser software as may be utilized according to embodiments of the invention include INTERNET EXPLORER available from Microsoft Corporation, FIREFOX available from Mozilla Corporation, SAFARI available from Apple Inc., and NETSCAPE NAVIGATOR available from Netscape communications Corporation.

User system 120 of embodiments comprises one or more processor-based systems operable to provide operation as described herein. For example, user system 120 may comprise a computer having a processor (e.g., processors from the PENTIUM and/or XEON lines of processors available from Intel Corporation), memory (e.g., random access memory (RAM), read only memory (ROM), magnetic memory, optical memory, flash memory, etc.), input/output apparatuses (e.g., display, keyboard, mouse, printer, etc.), and network interface (e.g., Ethernet interface, optical interface, T1 interface, etc.) operable under control of an instruction set defining operation as described herein. The illustrated embodiment of user system 120 includes scanner 121, operable to provide information regarding physical items (e.g., items to be shipped), scale 122, operable to weigh physical items (e.g., items to be shipped), and printer 123, operable to provide printing of information (e.g., postage indicia 102*a*-102*c*).

Server system 110 may likewise comprise one or more processor-based systems operable to provide server side operation. For example, server system 110 may comprise a computer having a processor (e.g., processors from the PENTIUM and/or XEON lines of processors available from Intel Corporation), memory (e.g., RAM, ROM, magnetic memory, optical memory, flash memory, etc.), input/output apparatuses (e.g., display, keyboard, mouse, printer, etc.), and network interface (e.g., Ethernet interface, optical interface, T1 interface, etc.) operable under control of an instruction set defining operation as a postage server and/or other server operation.

Network 150 may comprise one or more networks suitable for facilitating communication between user system 120 and other systems, such as server system 110, other user systems, etc. For example, network 150 may comprise a local area network (LAN), metropolitan area network (MAN), wide area network (WAN), wireless network, the public switched telephone network (PSTN), the Internet, an intranet, an extranet, etc.

It should be appreciated that network 150 may include systems in addition to server system 110 and user system 120, whether utilized in providing functionality associated with server system 110 and user system 120 or separate therefrom. For example, network 150 may comprise additional servers and user systems in addition to routers, gateways, bridges, repeaters, switches, caches, etc.

In operation according to embodiments of the invention, user system 120 functions to provide a user interface for shipping processing. Accordingly, user system 120 may operate under control of an instruction set (e.g., one or more computer program) to collect raw data regarding items to be shipped, user data regarding items to be shipped, etc. Additionally or alternatively, operation of user system 120 under control of such an instruction set may derive data, such as to calculate shipping rates, delivery time frames, etc. Such operation of user system 120 may be in cooperation with one or more other systems. For example, user system 120 may communicate with another of the shipper's systems, such as an order processing system, to obtain raw data regarding items to be shipped, with a system of another entity, such as server system 120, to obtain derived data, etc.

Figure 2:
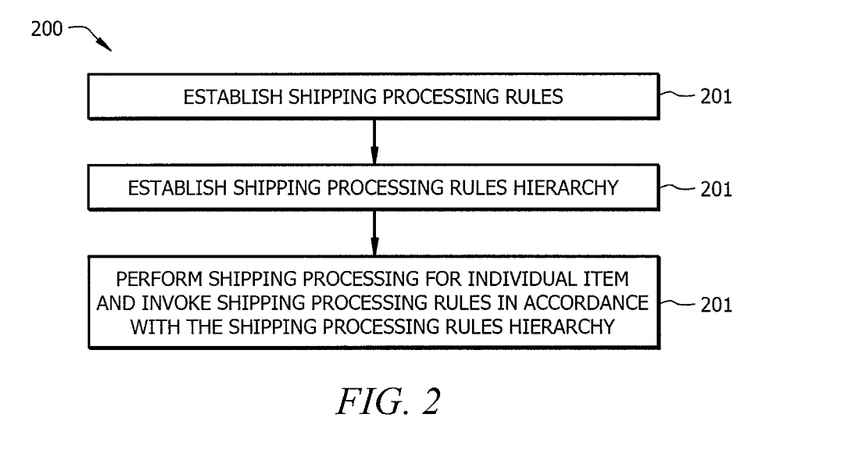
FIG. 2 shows a high level flow diagram of shipping processing using a rules based engine according to embodiments.

FIG. 2 shows a high level flow diagram of operation of system 100 implementing shipping processing using a rules based engine according to embodiments herein. As described in detail below, operation in according to shipping processing flow 200 of FIG. 2 establishes a hierarchy of shipping processing rules which, when implemented during shipping processing, are executed in a particular order to address decision points in processing individual items for shipping. Accordingly, operation of a rules based engine in accordance with the embodiments of FIG. 2 facilitates processing of a variety of different items for shipping by a high volume shipper.

At block 201 of the embodiment illustrated in FIG. 2 one or more shipping processing rules are established using system 100. For example, embodiments of the invention provide a user interface, such as may be specifically adapted as a rules interface, adapted to allow a user to create desired rules. A user may select a shipping rules tool within the user interface and be provided a dialog box facilitating creation, management, organization, implementation, etc. of one or more shipping rules to provide shipping operation according to a user's needs and desires. For example, the user may be given a list of various parameters from which to create rules. Additionally or alternatively, the user may be given a list of rules (whether user created or otherwise provided) from which to choose desired rules to implement.

The user interface provided according to embodiments of the invention provides enhanced functionality for facilitating the creation, management, organization, implementation, etc. of shipping rules. For example, a user interface of embodiments provides a rules analysis feature operable to allow a user to compare the results of implementing various different rules, different parameters within a rule, etc. A user may, for example, be provided with an analysis option whereby a plurality of rules under consideration (or variations of one or more rules under consideration) are compared. Such analysis may utilize historical shipping data (e.g., the user's shipping data from a selectable window in time), simulated shipping data (e.g., data typical to the user's situation), shipping data of other users of the technology, etc. to analyze operation of the rules under consideration (or variations of rules under consideration) to determine the results of invoking the rules (e.g., provide a cost comparison, a delivery time comparison, etc.). A user may use this information in selecting particular rules to implement, to optimize rules for providing desired results, and/or the like.

In operation according to embodiments, a user is presented with, or otherwise provided access to, a plurality of rule parameters from which various rules may be constructed. Rule parameters utilized according to embodiments of the invention may comprise various different types of parameters which, when linked or otherwise associated, define a shipping processing rule herein. For example, embodiments of such rule parameters include conditions, operators, and outcomes. Conditions of embodiments of rule parameters comprise conditions which are determined from or associated with raw shipping data, user defined data, derived data, etc. Operators of embodiments of rule parameters comprise logical operators, mathematical operators, etc. which are applicable with respect to conditions for making decisions and determinations. Outcomes of embodiments of rule parameters comprise shipping processing decisions, determinations, etc. to be applied when a rule is met.

In operation according to embodiments, a user interacts with user system 120 using the aforementioned user interface to establish desired shipping processing rules. By selecting and associating various of the foregoing rule parameters (i.e., conditions, operators, and/or outcomes) through the rules interface a user may establish various desired rules. For example, a rules interface may present the user with a graphical user interface from which various rule parameters may be selected and linked to provide desired rules.

By way of example, conditions such as "estimated delivery date is greater than W days," "customer type is gold," "out of state shipment," "intrastate shipment," "average delivery time is less than X days," "price is less than Y," and "customer has been using the service for less than Z days," operators such as "or," "and," "then," "+,", "−,", ">", "<," "=", and outcomes such as "ship express mail," "ship flat box," "ship non-flat rate box," "ship express mail," "ship cheapest available rate," and "edit customer memo field to show package was shipped" may be presented to a user. The user may select from such conditions, operators, and outcomes to define various rules such as: "If estimated delivery date is greater than 30 days and customer type is gold then ship express mail and edit customer memo field to show package was shipped"; "If out of state shipment then ship flat rate box"; "If intrastate shipment then ship non-flat rate box"; "If price is less than $30 then ship express mail"; "If customer has been using the service for less than 30 days then ship express mail"; and "Ship cheapest available rate and average delivery time is less than 2 days".

Shipping processing rules utilized according to embodiments of the invention are preferably based upon logical conditions, rather than hard coded values. For example, rather than hard coding a particular size of an item for a condition used in a shipping processing rule, the condition may be established logically, such as "flat-rate box size". Although additional data, such as a database storing size information for flat-rate boxes, may be utilized in such logical condition scenarios, rule applicability may be more readily adapted for changes in various underlying qualifications. For example, rather than revising each rule implementing a condition related to flat-rate box sizing when a change is made to flat-rate box size qualifications, an appropriate database entry or entries may be changed and all associated shipping processing rule operation correspondingly updated.

It should be appreciated that shipping processing rules implemented according to embodiments of the invention may be established without direct input by a user. For example, embodiments of the invention provide a rules based engine which operates to establish various shipping processing rules automatically, such as using various information available to the rules based engine.

Algorithms of a rules based engine providing automated rule creation according to embodiments operate to analyze past shipping behavior of a user to establish one or more shipping processing rules. For example, algorithms of a rules based engine may analyze historical information with respect to a user's shipping processing (e.g., past manual shipping processing) in order to create or revise one or more shipping processing rules operable to provide shipping in accordance with, or otherwise approximating, the user's historical shipping decisions. Such algorithms may operate to learn based upon operation of implemented rules, shipping results, shipping data, etc. to establish or change rules (or to suggest new rules or rule changes to a user).

Additionally or alternatively, a rules based engine providing automated rule creation according to embodiments operates to compare item shipping processing determinations with available options to establish one or more rules. For example, algorithms of a rules based engine may analyze a shipping processing determination (whether made manually by a user, in accordance with the application of a shipping processing rule, etc.) and compare attributes thereof (e.g., rate, delivery time frame, special handling, etc.) with attributes provided by alternative determinations for establishing alternative shipping processing rules. Rules established by such an automated rule creation algorithm may operate to provide the same or substantially the same attributes, improved attributes, or combinations thereof. For example, one such shipping processing rule may operate to provide the same or substantially the same shipping results (e.g., delivery time frame and special handling) at less cost.

A rules based engine providing automated rule create according to embodiments may additionally or alternatively operate to analyze various available information for establishing one or more shipping processing rule. For example, algorithms of a rules based engine may analyze information such as item shipment tracking information (e.g., actual delivery time frames), shipment volume information (e.g., historical and/or projected shipping volume metrics), customer order information (e.g., historical and/or projected customer order activity metrics), etc. in order to establish shipping processing rules facilitating efficient, cost effective, and/or desirable for shipping processing by a user. By way of example, analysis of historical information may indicate that several shipping selections result in deliveries in less than 2 days (although perhaps the options which guarantee 2 day delivery are not as numerous) and thus automated rule creation algorithms may create a rule such as "If 2 day delivery is selected then ship cheapest available rate and less than 2 day historical delivery."

The foregoing rules are preferably presented, or otherwise made available, for selection, implementation, etc. according to embodiments of the invention to thereby provide an established set of shipping processing rules. For example, the aforementioned user interface may present a plurality of rules, created by one or more of the above techniques, for selection by a user to establish the desired shipping processing rules. Additionally or alternatively, algorithms of embodiments may operate to automatically select particular rules to establish the desired shipping processing rules. For example, the plurality of rules may be analyzed to identify conflicting rules (e.g., rules wherein the same conditions present different outcomes) and to select a rule of a conflicting set of rules which provides a most desired or "best" outcome, such as lowest cost, most rapid delivery time, highest level of service, and/or the like. Thus, a set of non-conflicting rules may be selected to establish the desired shipping processing rules.

After establishing shipping processing rules at block 201, a hierarchy of the shipping processing rules is established at block 202 of the illustrated embodiment using system 100. For example, the aforementioned user interface of embodiments provides a graphical user interface in which a user is enabled to order the established shipping processing rules in a graphical hierarchy consistent with a desired hierarchical implementation. A user may interact with the user interface to select a rule and move the rule into a position in a graphical hierarchy representative of the desirability, applicability, etc. of the rule. Additionally or alternatively, the rules may be weighted according to one or more aspects thereof and thus placed in a hierarchy in accordance with such weighting. For example, numerical weighting may be assigned to the desirability, applicability, etc. of particular aspects (e.g., particular conditions, particular outcomes, etc.) whereby such numerical weighting (whether with respect to a single aspect or aggregated for a plurality of aspects of a rule) is used at least in part to establish a rule hierarchy. Such weighting may, for example, be used to establish a shipping processing rules hierarchy automatically using algorithms operable upon system 100.

Regardless of the particulars of how it is accomplished according to embodiments, the foregoing hierarchical implementation preferably establishes an environment in which a plurality of rules are weighted or ordered for hierarchical implementation. Thus, for example, a most desired shipping processing rule (e.g., providing a most desired outcome with respect to particular conditions) may be placed highest in the hierarchy and a less desired shipping processing rule (e.g., providing a less desired outcome with respect to particular conditions) may be placed lower in the hierarchy to thereby define an application of shipping processing rules operable to invoke less desired rules only if more desired rules are not found to be applicable to the particular conditions present. By way of example, a hierarchy of rules may comprise: "If customer type is gold then ship express mail"; "If customer order is greater than $50 then ship express mail"; and "If customer has been using the service for less than 30 days then ship priority mail."

At block 203 of the illustrated embodiment shipping processing is performed by system 100 with respect to individual items (e.g., 101a-101c) by invoking the shipping processing rules in accordance with the shipping processing rules hierarchy. For example, as an individual item is processed user terminal 120 may analyze information for determining various conditions relevant to the established shipping processing rules. The determined conditions may be utilized with respect to rules of the established hierarchy, using the operators of a particular applied rule, to determine if a particular outcome is to be applied with respect the item. Each rule of the shipping processing rules hierarchy may be traversed in turn until the determined conditions indicate an outcome through applicability of one or more rules.

Information used for determining various conditions may be provided by a number of sources according to embodiments of the invention. For example, raw shipping data may be provided in the form of item weight, address information (e.g., origination address, destination address, shipping hub location, etc.), item size (e.g., length, width, height, girth, etc.), shipping container type (e.g, envelope, standard box, non-standard box, pallet, etc.), item type (e.g., book, hazardous material, glass, perishable, etc.), and/or the like, as may be provided by scanner 121, scale 122, user input, database entries stored within system 100, etc. Additionally or alternatively, user defined data may be provided in the form of customer category (e.g., bronze, silver, gold, etc.), quality of service (e.g., good, better, best, etc.), pricing category (e.g., economy, standard, premium, etc.), delivery time category (e.g., any time, priority, overnight, etc.), and/or the like, as may be provided by user input, database entries stored within system 100, etc. Moreover, derived data may be provided in the form of calculated rates, calculated delivery date/time, and/the like, as may be provided by algorithms of system 100. Detail with respect to calculation of some forms of derived data as may be utilized according to embodiments of the invention is provided in the above referenced United States patent application entitled "Systems and Methods for Providing Localized Functionality in Browser Based Postage Transactions."

Performance of shipping processing at block 203 preferably implements one or more outcomes as indicated by applicable shipping processing rules for each item. Such outcomes may, for example, provide for generation of a corresponding postage indicia, such as using server 110, user terminal 120, and printer 123. Detail with respect to techniques for generating and printing postage indicia as may be utilized according to embodiments of the invention is provided in the above referenced United States patent applications entitled "System and Method for Printing Postage Indicia with Post-By Date," "Virtual Security Device," and "System and Method for Dynamically Partitioning a Postage Evidencing System."

The postage indicia may comprise an appropriate postage amount, service class, special handling instructions, etc. Performance of an outcome may include generation of documents in addition to or in alternative to the aforementioned postage indicia, such as bills of lading, special delivery instructions, waybills, manifests, shipping labels, invoices, shipping records, etc. It should be appreciated that various outcomes may result in items being shipped using different shipping service providers (e.g., United States Postal Service, United Parcel Service, Federal Express, etc.), and thus a particular outcome may invoke different processes and/or systems of system 100 to implement an indicated result. Accordingly, application of the shipping processing rules in accordance with the established shipping processing rules hierarchy by a shipping processing rules engine of embodiments results in the collection of parameters, such as conditions data, and performing service commitment decisions with actions as a result of the identified outcomes.

Performance of an outcome may, according to embodiments, not result directly in completed shipping processing of an item. For example, operation of a shipping processing rules engine of embodiments may determine that no established shipping processing rule applies or an established shipping processing rule which does apply has an outcome defining a result, whereby the item it identified for manual shipping processing or other processing beyond the operation of a shipping processing rules engine.

From the above, it can be appreciated that operation of a shipping processing rules engine may provide shipping processing with respect to a plurality of items, making appropriate service commitment decisions, thereby saving the user from having to make such decisions on a case by case basis. Thus, embodiments of system 100 operating in accordance with shipping processing flow 200 serves high volume shippers in particular.

Although operation of flow 200 has been described above with reference to the creation and application of shipping processing rules, operation in accordance with embodiments may revise/edit rules, enable/disable rules, etc. For example, operation at blocks 201 and 202 of embodiments of shipping processing flow 200 may allow a user and/or automated algorithms to revise previously created rules and revise weighing or ordering of the rules.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for generating shipping rules configured to make shipping decisions on behalf of a user, said method comprising:

compiling, by a processor-based system of a shipping services operator, raw shipping data based on shipments made by a plurality of shippers, wherein, for each of the shipments made by the plurality of shippers, the raw shipping data comprises at least one of shipment weight information, address information, shipment size information, shipping container type information, and item type information;

compiling, by the processor-based system, user defined data comprising information associated with at least one of one or more customer categories, one or more pricing categories, one or more delivery time categories, and one or more quality of service levels provided to said processor-based system by said user;

deriving information associated with one or more shipments to generate derived data, the derived data comprising at least one of calculated shipping rates, delivery dates, and delivery times;

automatically constructing, by said processor-based system for said user, a plurality of shipping processing rules for making shipping decisions, wherein the plurality of shipping processing rules are constructed based on rule parameters and a data set, wherein the rule parameters comprise conditions and operators, the conditions comprising shipping attribute information for making shipping processing decisions, determinations, or both, the operators comprising at least one of logical operators and mathematical operators that are applied to said conditions to make said shipping processing decisions, determinations, or both, determinations, or both, wherein the data set comprises the raw shipping data, the user defined data, and the derived data, and wherein constructing, by said processor-based system, the plurality of shipping processing rules comprises constructing at least one shipping processing rule configured to select, based on an amount of time that a customer has been using a service offered by said user, a type of shipping service for shipment of an item purchased from said user by said customer;

analyzing, by said processor-based system, the plurality of shipping processing rules to select shipping processing rules that define a set of shipping processing rules for generating postage indicia for said user, wherein said set of shipping processing rules includes said at least one shipping processing rule constructed based, at least in part, on said amount of time that said customer has been using said service, wherein said analyzing comprises:

analyzing, by said processor-based system, said plurality of shipping processing rules to identify whether a conflict exists between at least two shipping processing rules, wherein a conflict is identified based on a determination that applying the same conditions to said at least two shipping processing rules presents different shipping decisions; and automatically resolving, by said processor-based system, said conflict between said at least two shipping processing rules based on a conflict resolution parameter that specifies an outcome criterion, wherein automatically resolving the conflict comprises:

identifying, by said processor-based system, a particular shipping processing rule of the at least two shipping processing rules that satisfies the outcome criterion, wherein, when the outcome criterion is a time-based outcome criterion, the particular shipping processing rule of the at least two shipping processing rules that satisfies the outcome criterion corresponds to a shipping processing rule that provides a most rapid delivery time, wherein, when the outcome criterion is a cost-based outcome criterion, the particular shipping processing rule of the at least two shipping processing rules that satisfies the outcome criterion corresponds to a shipping processing rule that provides a lowest shipping cost, wherein, when the outcome criterion is a level of service-based outcome criterion, the particular shipping processing rule of the at least two shipping processing rules that satisfies the outcome criterion corresponds to a shipping processing rule that provides a highest level of service; and selecting, by said processor-based system, the particular shipping processing rule that satisfies the outcome criterion for inclusion in the set of shipping processing rules; and generating a postage indicium for an item to be shipped, wherein said generating comprises:
receiving shipping information for said item to be shipped, and
utilizing said set of shipping processing rules and said shipping information to generate said postage indicium for said item to be shipped.

2. The method of claim 1 further comprising:
constructing, by said processor-based system for said user, at least one additional shipping processing rule based on preferences of another user.

3. The method of claim 2 wherein said preferences of said another user are not defined by said another user inputting shipping information, but instead, said preferences of said another user are determined by said processor-based system analyzing said raw shipping data.

4. The method of claim 2 further comprising:
selecting said at least one additional shipping processing rule constructed based on said preferences of said another user in said set of shipping processing rules for generating postage indicia for said user.

5. The method of claim 1 further comprising:
establishing a hierarchy of said plurality of shipping processing rules.

6. The method of claim 5 wherein at least a portion of said hierarchy is automatically established by said processor-based system.

7. The method of claim 1 wherein said plurality of shipping processing rules are generated based, at least in part, on an analysis by said processor-based system, of previous shipments by said user, wherein said previous shipments are limited to a particular set of previous shipments by said user.

8. The method of claim 7 wherein said previous shipments by said user are limited based on a window of time.

9. The method of claim 1 further comprising:
constructing, by said processor-based system for said user, at least one other shipping processing rule based on simulated shipping data.

10. The method of claim 1 further comprising:
receiving, from at least one carrier, shipping options offered by said carrier, wherein said plurality of shipping processing rules are further constructed based on at least one of said received shipping options.

11. The method of claim 1 wherein said user is a high volume shipper, and wherein said processor-based system is configured to modify said plurality of shipping processing rules based on a shipping behavior of said user, said method further comprising:
analyzing, by said processor-based system, previous shipments by said user over a period of time to learn said shipping behavior of said user; and
revising, by said processor-based system, one or more of said plurality of shipping processing rules based on said learning, wherein revising said one or more of said plurality of shipping processing rules comprises:
modifying, for each of said one or more of said plurality of shipping processing rules, at least one of said conditions and said operators to generate one or more modified shipping processing rules.

12. A system configured to make shipping processing decisions on behalf of a user, said system comprising:
a rules engine configured to create, for said user, a set of shipping processing rules for making shipping decisions for said user, wherein said set of shipping processing rules is generated by:
automatically constructing a plurality of shipping processing rules based on rule parameters and a data set, wherein the rule parameters comprise conditions and operators, wherein the conditions comprise shipping attribute information for making shipping processing decisions, determinations, or both, and the operators comprise at least one of logical operators and mathematical operators that are applied to said conditions to make said shipping processing decisions, determinations, or both,
wherein the data set comprises:
raw shipping data comprising at least one of shipment weight information, address information, shipment size information, shipping container type information, and item type information,
user defined data comprising information associated with at least one of one or more customer categories, one or more pricing categories, one or more delivery time categories, and one or more quality of service levels provided by said user, and derived data comprising at least one of calculated shipping rates, delivery dates, delivery times, and wherein construction of the plurality of shipping processing rules by said rules engine comprises constructing at least one shipping processing rule configured to select, based on an amount of time that a customer has been using a service offered by said user, a type of shipping service for shipment of an item purchased from said user by said customer;

analyzing the plurality of shipping processing rules to define said set of shipping processing rules, wherein said set of shipping processing rules includes said at least one shipping processing rule constructed based, at least in part, on said amount of time that said customer has been using said service, wherein said analyzing comprises:

analyzing, by a processor-based system, said plurality of shipping processing rules to identify whether a conflict exists between at least two shipping processing rules, wherein a conflict is identified based on a determination that applying the same conditions to said at least two shipping processing rules presents different shipping decisions; and automatically resolving, by said processor-based system, said conflict between said at least two shipping processing rules based on a conflict resolution parameter that specifies an outcome criterion, wherein automatically resolving the conflict comprises:

identifying, by said processor-based system, a particular shipping processing rule of the at least two shipping processing rules that satisfies the outcome criterion, wherein, when the outcome criterion is a time-based outcome criterion, the particular shipping processing rule of the at least two shipping processing rules that satisfies the outcome criterion corresponds to a shipping processing rule that provides a most rapid delivery time, wherein, when the outcome criterion is a cost-based outcome criterion, the particular shipping processing rule of the at least two shipping processing rules that satisfies the outcome criterion corresponds to a shipping processing rule that provides a lowest shipping cost, wherein, when the outcome criterion is a level of service-based outcome criterion, the particular shipping processing rule of the at least two shipping processing rules that satisfies the outcome criterion corresponds to a shipping processing rule that provides a highest level of service; and selecting, by said processor-based system, the particular shipping processing rule that satisfies the outcome criterion for inclusion in the set of shipping processing rules; and a computer processor configured to perform shipment processing for an item to be shipped, wherein said shipment processing comprises:

receiving shipping information for said item to be shipped, and utilizing said set of shipping processing rules and said received shipping information to generate a postage indicium for said item to be shipped.

13. The system of claim 12 wherein said computer processor is further configured to construct, for said user, at least one additional shipping processing rule based on preferences of another user.

14. The system of claim 13 wherein said preferences of said another user are not defined by said another user inputting shipping information, but instead, said preferences of said another user are determined by analyzing past shipping behavior of said another user.

15. The system of claim 14 wherein said computer processor configured to perform shipment processing further comprises:

said computer processor being configured to utilize said at least one additional shipping processing rule and said received shipping information to generate said postage indicium for said item to be shipped.

16. The system of claim 12 wherein said set of shipping processing rules comprises at least two shipping processing rules, and wherein said rules engine is further operable to establish a hierarchy of said at least two shipping processing rules.

17. The system of claim 16 wherein at least a portion of said hierarchy is automatically established by said rules engine.

18. The system of claim 12 wherein said rules engine further constructs said plurality of shipping processing rules based, at least in part, on an analysis of previous shipments by said user, wherein said previous shipments are limited to a particular set of previous shipments by said user.

19. The system of claim 18 wherein said particular set of previous shipments by said user are limited based on a window of time.

20. The system of claim 12 wherein said rules engine is further configured to create, for said user, at least one other shipping processing rule based on simulated shipping data.

21. The system of claim 12 wherein said rules engine is further configured to receive shipping options, wherein shipping options are shipping options that are offered by a carrier.

22. The system of claim 21 wherein said plurality of shipping processing rules are further created based on at least one of said received shipping options.

23. The system of claim 12 wherein said system is configured to process mail items for a high volume shipper.

24. A system configured to make shipping decisions on behalf of a user, said system comprising:

means for creating a data set comprising raw shipping data, user defined data, and derived data, wherein the raw shipping data is created based on shipments made by a plurality of shippers, wherein, for each of the shipments made by the plurality of shippers, the raw shipping data comprises shipment weight information, address information, shipment size information, shipping container type information, item type information, or a combination thereof, wherein the user defined data comprises information associated with one or more customer categories, one or more pricing categories, one or more delivery time categories, one or more quality of service levels, or a combination thereof, wherein said user defined data is provided to said system by users of said system, wherein said derived data comprises calculated shipping rates, delivery dates, delivery times, or a combination thereof;

means for creating, for said user, a plurality of shipping processing rules for making shipping decisions using rule parameters and said data set, wherein the rule parameters comprise conditions and operators, wherein the conditions comprise shipping attribute information for making shipping processing decisions, determinations, or both, wherein the operators comprise at least one of logical operators and mathematical operators that are applied to said conditions to make said shipping processing decisions, determinations, or both, and wherein creation of the plurality of shipping processing rules comprises creating at least one rule configured to select, based on an amount of time that a customer has been using a service offered by said user, a type of shipping service for shipment of an item purchased from said user by said customer;

means for analyzing said plurality of shipping processing rules to define a rules set for generating postage indicia for said user, wherein said rules set includes said at least one rule constructed based, at least in part, on said amount of time that said customer has been using said service, said means for analyzing further comprising:

means for analyzing said plurality of shipping processing rules to identify whether a conflict between two or more shipping processing rules of said plurality of shipping processing rules exists, wherein a conflict is identified based on a determination that applying the same conditions to said at least two shipping processing rules presents different shipping decisions; and means for automatically resolving said conflict between said two or more shipping processing rules based on a conflict resolution parameter that specifies an outcome criterion, wherein said means for automatically resolving said conflict comprises:

means for identifying a particular shipping processing rule of said two or more shipping processing rules that satisfies the outcome criterion, the outcome criterion comprising at least one of: a time-based outcome criterion, a cost-based outcome criterion, and a level of service-based outcome criterion, wherein, when the outcome criterion is said time-based outcome criterion, the particular shipping processing rule of said two or more shipping processing rules that satisfies the outcome criterion corresponds to a shipping processing rule that provides a most rapid delivery time, wherein, when the outcome criterion is said cost-based outcome criterion, the particular shipping processing rule of said two or more shipping processing rules that satisfies the outcome criterion corresponds to a shipping processing rule that provides a lowest shipping cost, wherein, when the outcome criterion is said level of service-based outcome criterion, the particular shipping processing rule of said two or more shipping processing rules that satisfies the outcome criterion corresponds to a shipping processing rule that provides a highest level of service; and means for selecting the particular shipping processing rule that satisfies the outcome criterion for inclusion in said rules set; and means for performing shipment processing of an item to be shipped, wherein said performing comprises:

means for receiving information about said item to be shipped; and means for utilizing said rule set and said received information to generate a postage indicium for said item to be shipped.

25. The system of claim 24 further comprising:
means for creating at least one additional shipping processing rule for said user based on preferences of another user.

26. The system of claim 25 wherein said preferences of said another user are not defined by said another user inputting shipping information, but instead, said preferences of said another user are determined based on an analysis of previous shipments by said another user.

27. The system of claim 26 wherein said means for performing shipment processing further comprises:
means for utilizing said at least one additional shipping processing rule and said received information to generate said postage indicium for said item to be shipped.

28. The system of claim 24 further comprising:
means for establishing a hierarchy of said rules set.

29. The system of claim 28 wherein at least a portion of said hierarchy is automatically established by said means for analyzing said plurality of shipping processing rules to define said rules set.

30. The system of claim 24, wherein said means for creating said plurality of shipping processing rules is further configured to generate said plurality of shipping processing rules based, at least in part, on an analysis, by said means for creating said plurality of shipping processing rules, of previous shipments by said user, and wherein said previous shipments by said user are limited to a particular set of previous shipments by said user.

31. The system of claim 30 wherein said particular set of previous shipments by said user are limited based on a window of time.

32. The system of claim 24 further comprising:
means for simulating shipping data to create, for said user, at least one other shipping processing rule.

33. The system of claim 24 further comprising:
means for receiving, from at least one carrier, shipping options offered by said at least one carrier.

34. The system of claim 33 wherein said plurality of shipping processing rules are further created based on at least one of said received shipping options.

35. The system of claim 24, wherein said user is a high volume shipper, and wherein said system further comprises means for revising said plurality of shipping processing rules based on a shipping behavior of said user, said means for revising comprising:

means for analyzing previous shipments by said user over a period of time to learn said shipping behavior of said user; and means for modifying one or more of said plurality of shipping processing rules based on said learned shipping behavior of said user, wherein, for each of said one or more of said plurality of shipping processing rules, said means for modifying changes at least one of said conditions and said operators to generate one or more modified shipping processing rules.

* * * * *